United States Patent
Ohm et al.

(10) Patent No.: US 8,471,174 B2
(45) Date of Patent: Jun. 25, 2013

(54) METHOD FOR WELDING TIP OF ELECTRODE IN SPARK PLUG

(75) Inventors: Dae Yeol Ohm, Seoul (KR); Seok Ki Song, Daejeon (KR); Hyun Joong Kim, Cheongju (KR); Byung Heon Shin, Gwangju (KR); Young Tae Yoo, Gwangju (KR)

(73) Assignee: Yura Tech Co., Ltd. (KR)

( * ) Notice: Subject to any disclaimer, the term of this patent is extended or adjusted under 35 U.S.C. 154(b) by 350 days.

(21) Appl. No.: 12/741,511

(22) PCT Filed: Apr. 2, 2008

(86) PCT No.: PCT/KR2008/001846
§ 371 (c)(1),
(2), (4) Date: May 5, 2010

(87) PCT Pub. No.: WO2009/061040
PCT Pub. Date: May 14, 2009

(65) Prior Publication Data
US 2010/0258541 A1    Oct. 14, 2010

(30) Foreign Application Priority Data
Nov. 6, 2007  (KR) .................. 10-2007-0112724

(51) Int. Cl.
*B23K 26/00*  (2006.01)
(52) U.S. Cl.
USPC ............. 219/121.64; 219/121.61; 219/121.62
(58) Field of Classification Search
USPC ........................... 219/121.61, 121.62, 121.64
See application file for complete search history.

(56) References Cited

U.S. PATENT DOCUMENTS

| | | | |
|---|---|---|---|
| 6,997,767 B2 | 2/2006 | Taniguchi et al. | |
| 7,199,511 B2 | 4/2007 | Hori | |
| 2002/0017846 A1 | 2/2002 | Hori | |
| 2004/0027042 A1* | 2/2004 | Matsutani et al. | ............ 313/141 |
| 2007/0080618 A1 | 4/2007 | Torii | |

FOREIGN PATENT DOCUMENTS

| | | |
|---|---|---|
| CN | 101657944 | 2/2010 |
| EP | 1049222 | 11/2000 |

(Continued)

OTHER PUBLICATIONS

International Search Report—PCT/KR2008/001846 dated Jul. 25, 2008.
European Search Report—European Application No. 08741096.5 issued by the Europearn Patent Office on Nov. 2, 2010.
Chinese Office Action—Chinese Application No. 200880114999.5 issued on Jul. 4, 2012, citing CN101657944, JP2001015245 and JP277767.

*Primary Examiner* — Tan N Tran
(74) *Attorney, Agent, or Firm* — Cantor Colburn LLP

(57) ABSTRACT

A method of welding a noble metal tip of a spark plug to an electrode is provided. In the method of welding, in a waveform of a power of a laser beam according to a time of the laser welding, a power of a central portion thereof is smaller than those of both end portions thereof. In addition, the waveform of the power of the laser beam according to a time of the laser welding is a trapezoidal waveform which includes: a rising portion in which the power of the laser beam is gradually increased; a power maintaining portion in which the power of the laser beam after the rising portion is maintained uniform; and a falling portion in which the power of the laser beam after the power maintaining portion is gradually decreased. In addition, the waveform of the power of the laser beam according to a time of the laser welding is a triangular waveform which includes: a rising portion in which the power of the laser beam is gradually increased; and a falling portion in which the power of the laser beam after the rising portion is gradually decreased. Accordingly, it is possible to securely attach the electrode tip to a central electrode or a ground electrode.

1 Claim, 7 Drawing Sheets

FOREIGN PATENT DOCUMENTS

| | | |
|---|---|---|
| EP | 2133968 | 12/2009 |
| GB | 2218660 | 11/1989 |
| JP | 05-277767 | 10/1993 |
| JP | 2001015245 | 1/2001 |
| JP | 2002-050448 | 2/2002 |
| JP | 2007-134318 | 5/2007 |

* cited by examiner

Figure 11
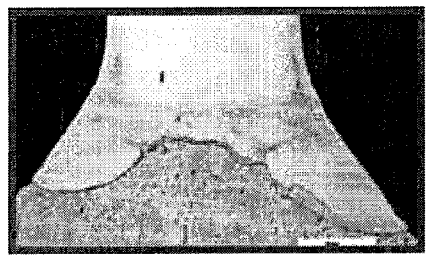
Figure 12
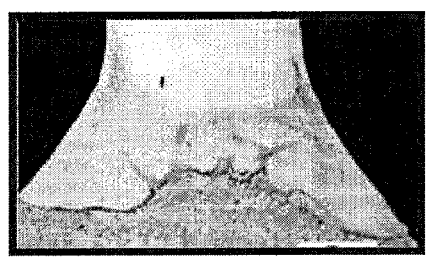
Figure 13
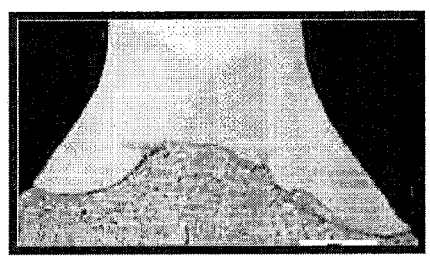
Figure 14
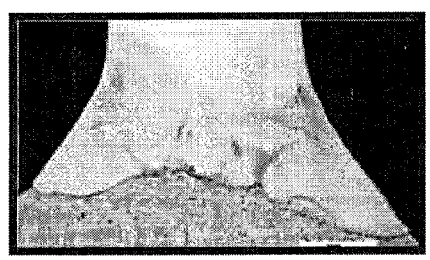
Figure 15
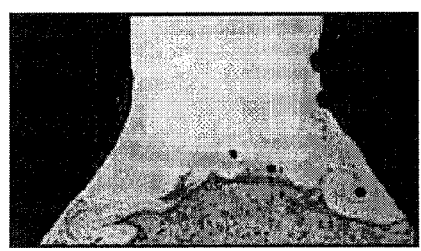
Figure 16

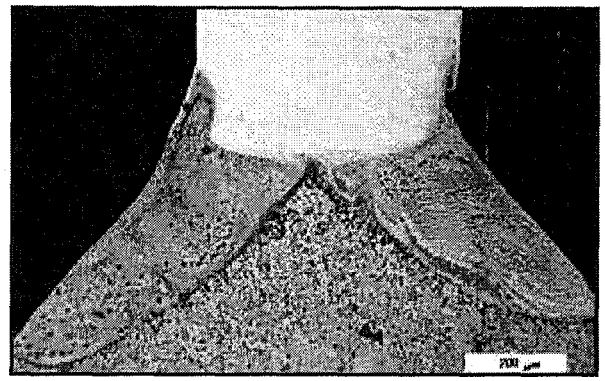
Figure 23
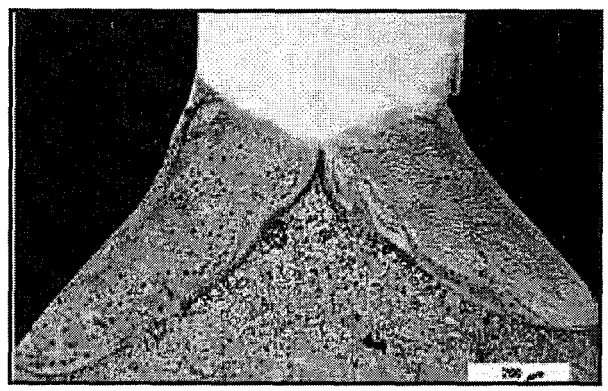
Figure 24
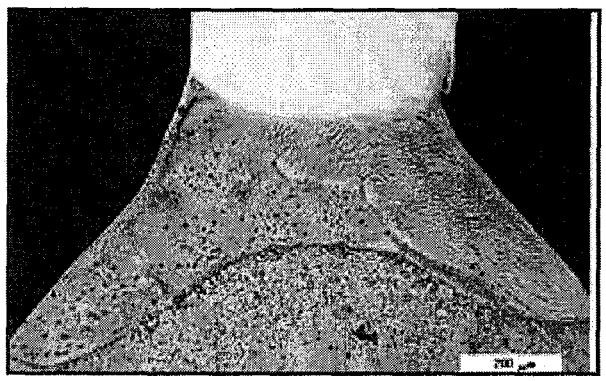

METHOD FOR WELDING TIP OF ELECTRODE IN SPARK PLUG

TECHNICAL FIELD

The present invention relates to a method of welding a spark plug electrode tip, and more particularly, to a method of welding a spark plug electrode tip so as to attach a noble metal electrode tip of a spark plug to an electrode.

BACKGROUND ART

A spark plug is a part for generating a spark to burn a fuel in an engine. In order to generate the spark, a central electrode and a ground electrode is separated from each other by a predetermined gap. In order to improve an efficiency of combustion in engine, an electrode tip is coupled with the central electrode and the ground electrode.

In general, the central electrode and the ground electrode are made of nickel (Ni). The electrode tip coupled with the electrode is made of a platinum-group noble metal such as iridium (Ir) or an alloy thereof. The electrode tip is fixed to the central electrode and the ground electrode by welding. As an example of the welding method, there are laser welding, electron beam welding, resistance welding, and the like.

Recently, the laser welding has been actively developed as a method of coupling the electrode tip with the central electrode. The laser welding method has advantages of a small input heat amount, a thermal deformation, and availability for precision welding, but it has disadvantage that the method is sensitive to welding process parameters. In the laser welding method, a high density energy of the laser beam is concentrated on a connected portion between the central electrode or ground electrode and the noble metal tip. Therefore, Ni that is the main component of the electrode, and the iridium alloy are melted, so that a intermediate melting layer having an intermediate coefficient of linear expansion can be formed, and thus, a thermal stress can be alleviated.

According to a research, if an energy of the laser beam is lower, a dissolving temperature at the time of welding is lowered. Therefore, only the nickel is melted, but the thermal stress cannot be alleviated. This is because a difference of melting points of the nickel (about 1,450° C.) and the iridium (2,450° C.) is very great. Moreover, a boiling point (about 2,700° C.) of the nickel approaches the melting point of the iridium. If the energy of the laser beam is too high, a temperature of the dissolved portion becomes high, so that the nickel is evaporated, and thus, defects occur. Particularly, since the laser beam used for the laser welding is a Gaussian beam, a central portion thereof causes excessive input heat. Therefore, there is a problem of poor quality of welding such as element deficiency caused from the evaporation.

For these reasons, much research needs to be made in order to securely fix the electrode tip to the ground electrode or the central electrode by using the laser welding.

DISCLOSURE

Technical Problem

The present invention provides a method of welding a spark plug electrode tip capable of firmly attaching an electrode tip to a central electrode or a ground electrode.

Technical Solution

According to an aspect of the present invention, there is provided a method of welding a spark plug electrode tip to attach a noble metal tip of a spark plug to an electrode by using laser welding, wherein a waveform of a power of a laser beam according to a time of the laser welding is a horseshoe-shaped waveform, in which a power of a central portion thereof is smaller than those of both end portions thereof.

In the above aspect of the present invention, the waveform of the power of the laser beam is a rectangular waveform, in which the power of the central portion thereof is smaller than those of both end portions thereof.

In addition, a total input heat amount of the laser beam is in a range of 70 J/cm$^2$ to 150 J/cm$^2$.

According to another aspect of the present invention, there is provided a method of welding a spark plug electrode tip to attach a noble metal tip of a spark plug to an electrode by using laser welding, wherein a waveform of a power of a laser beam according to a time of the laser welding is a trapezoidal waveform which includes: a rising portion in which the power of the laser beam is gradually increased; a power maintaining portion in which the power of the laser beam after the rising portion is maintained uniform; and a falling portion in which the power of the laser beam after the power maintaining portion is gradually decreased.

In the above aspect of the present invention, illumination times of the laser beam in the rising portion, the power maintaining portion, and the falling portion are substantially equal to each other.

In addition, a total input heat amount of the laser beam is in a range of 60 J/cm$^2$ to 150 J/cm$^2$.

In addition, the waveform of the power of the laser beam according to a time of the laser welding is a triangular waveform which includes: a rising portion in which the power of the laser beam is gradually increased; and a falling portion in which the power of the laser beam after the rising portion is gradually decreased.

In addition, illumination times of the laser beam in the rising portion and the falling portion are substantially equal to each other.

In addition, a total input heat amount of the laser beam is in a range of 60 J/cm$^2$ to 150 J/cm$^2$.

Advantageous Effects

According to the present invention, the following advantages can be obtained. However, the present invention needs not to have all the following advantages.

Firstly, the waveform of the power of the laser beam according to the time of the laser welding is set to the horseshoe-shaped waveform, the trapezoidal waveform, or the triangular waveform instead of the rectangular waveform, so that it is possible to solve a problem in that element deficiency and undercut caused from evaporation due to excessive input heat occurs at the central portion and humping (or generating beads) due to the undercut occurs at the surroundings.

In addition, a suitable total input heat amount of the laser beam according to these waveforms can be obtained, so that it is possible to securely weld the noble metal electrode tip to the central electrode or the ground electrode.

DESCRIPTION OF DRAWINGS

FIGS. 10 to 15 are photographs of cross sections after a horseshoe-shaped waveform beam with different input heat amounts is applied to a central electrode and a noble metal tip.

FIGS. 16 to 20 are photographs of cross sections after a trapezoidal waveform beam with different input heat amounts is applied to a central electrode and a noble metal tip.

FIGS. 21 to 24 are photographs of cross sections after a triangular waveform beam with different input heat amounts is applied to a central electrode and a noble metal tip.

MODE FOR INVENTION

Hereinafter, embodiments of the present invention will be described in detail with reference to the accompanying drawings. For clarifying the present invention, detailed description of well-known functions or configuration will be omitted.

Figure 1:
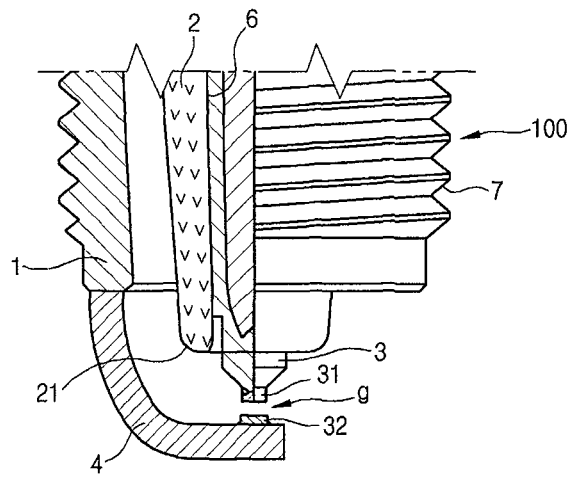
FIG. 1 is a partial sectional view illustrating a spark plug.

FIG. 1 is a partial cross-sectional view illustrating a spark plug.

As shown in FIG. 1, the spark plug includes a central electrode 3, an insulator 2 which is disposed outside of the central electrode 3, a metal housing 1 which is disposed outside of the insulator 2, and a ground electrode 4, of which one end is in contact with the metal housing 1 and of which the other end portion faces the central electrode 3. Electrode tips 31 and 32 are formed at positions which the central electrode 3 and the ground electrode 4 face each other.

Figure 2:
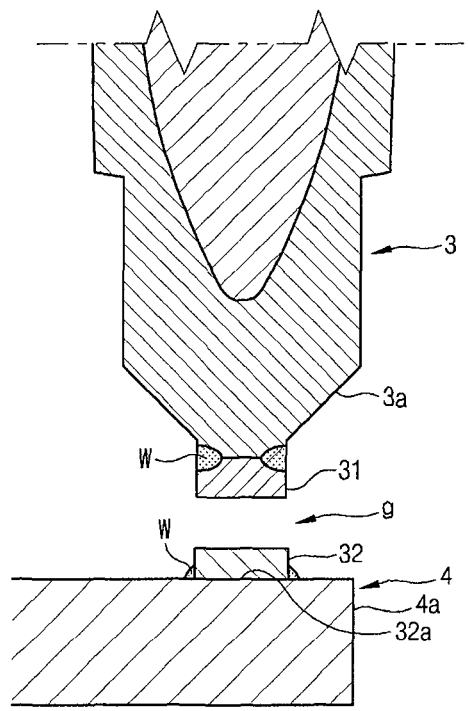
FIG. 2 is a cross-sectional view illustrating a central electrode and a ground electrode of FIG. 1.

FIG. 2 is a cross-sectional view illustrating the central electrode and the ground electrode of FIG. 1.

As shown in FIG. 2, a main body 3a of the central electrode 3 has a tapered end portion and a flat end surface. The electrode tip 31 is formed in a shape of disc. The electrode tip is disposed on the flat end surface. A laser welding technique, an electron beam welding technique, a resistance welding technique, or other suitable welding techniques are applied on an outer surface of a contact plane so as to form a welding line W. Therefore, the electrode tip 31 is securely fixed on the end surface of the central electrode 3. The opposite electrode tip 32 is disposed on the ground electrode 4. Similarly, a welding line W is formed on an outer surface of a contacted surface. Therefore, the electrode tip 32 is securely fixed on the ground electrode 4.

In some cases, one of the two opposite electrode tips 31 and 32 may be omitted. In this case, a spark discharge gap g is formed between the one of the electrode tips 31 and 32 and the ground electrode 4 (or central electrode 3).

The electrode tips 31 and 32 are formed by using generally a platinum-group noble metal, particularly, iridium. The electrode tips 31 and 32 are formed from a material obtained by mixing necessary alloy components and melting the mixture. Alternatively, the electrode tips may be formed as a dense alloy powder. Otherwise, the electrode tips may be formed from a sintered material obtained by mixing basic metal component powder with a specific ratio and sintering the dense alloy powder.

If the electrode tips 31 and 32 are formed from a melted alloy, a generated material of the melted alloy may be subject to processes including at least one of a rolling process, a tempering process, a stretching process, a cutting process, a shearing process, and a removing process, so that the electrode tips can have a specific shape.

Hereinafter, a welding process for fixing the aforementioned electrode tips 31 and 32 to the central electrode 3 or the ground electrode 4 by using the laser welding will be described.

Figure 3:
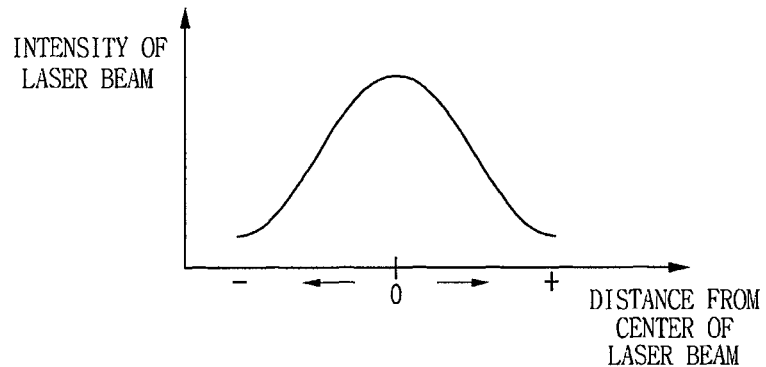
FIG. 3 is a graph illustrating an intensity of a laser beam according to a distance from a center of the laser beam used for laser welding.

FIG. 3 is a graph illustrating an intensity of the laser beam according to a distance from a center of the laser beam used for laser welding.

Figure 4:
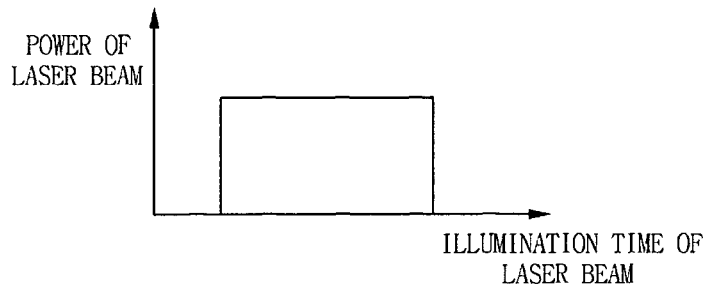
FIGS. 4 to 7 are graphs illustrating relationships of powers of laser beam according to an illumination time of the laser beam used for laser welding in embodiments of the present invention.

As shown in FIG. 3, the laser beam has a Gaussian distribution in which the intensity of the laser beam is highest at the center thereof and rapidly lowered at the surroundings. In a case where the laser beam having a rectangular waveform shown in FIG. 4 is illuminated, there is a problem in that element deficiency and undercut caused from evaporation due to excessive input heat occurs at the central portion and humping (or generating beads) due to the undercut occurs at the surroundings. Therefore, various waveforms of powers of the laser beam capable of preventing the excessive input heat and welding results according to the laser process parameters will be described.

Table 1 lists welding depths, average sizes of the humping, and frequencies of occurrence of the humping according to different input heat amounts of the laser beam having the rectangular waveform shown in FIG. 4. As the welding depth is increased, a coupling force of a coupled portion is increased. Therefore, the welding depth can be used as a measure of a quality of welding. The humping is a bumpy protuberance generated on a surface of a bead at the time of welding. The humping is one of defects of welding caused from the undercut due to the excessive input heat. In the experiment, a metal plate is formed by using nickel (used for the central electrode or the ground electrode) as a main component, argon (Ar) is used as a protection gas, and a beam moving speed is set to 500 mm/sec.

TABLE 1

| Input Heat Amount $(J/cm^2)$ | Illumination Time of Laser Beam (ms) | Power of Laser Beam (W) | Welding Depth ($\mu m$) | Size of Humping ($\mu m$) | Frequency of Occurrence of Humping |
|---|---|---|---|---|---|
| 15 | 150 | 100 | 157 | — | — |
| 30 | 150 | 200 | 392 | — | — |
| 45 | 150 | 300 | 569 | 35 | 1 |
| 60 | 150 | 400 | 682 | 66 | 1 |
| 75 | 150 | 500 | 769 | 101 | 1 |

Figure 5:
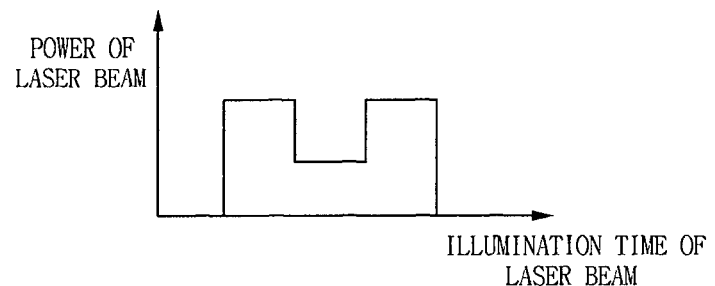

Table 2 lists welding depths, average sizes of the humping, and frequencies of occurrence of the humping according to different input heat amounts of the laser beam having the waveform shown in FIG. 5. In the waveform of the power of the laser beam according to the time of laser welding shown in FIG. 5, the power of the central portion 42 is set to be lower than the powers of the end portions 41. Namely, on the basis of rectangular waveform, the power of the central portion 42 is adjusted to be lower than the powers of the end portions. Hereinafter, the waveform shown in FIG. 5 is referred to as a horseshoe-shaped waveform. The input heat amount and other welding conditions are set similarly to the case of rectangular waveform.

TABLE 2

| Input Heat Amount (J/cm²) | Illumination Time of Laser Beam (ms) | Welding Depth (μm) | Size of Humping (μm) | Frequency of Occurrence of Humping |
| --- | --- | --- | --- | --- |
| 15 | 150 | 164 | — | — |
| 30 | 150 | 486 | — | — |
| 45 | 150 | 615 | — | — |
| 60 | 150 | 713 | — | — |
| 75 | 150 | 843 | — | — |

As seen from Table 2, the welding depth in the case of horseshoe-shaped waveform is slightly increased in comparison to the case of rectangular waveform. Particularly, any humping does not occur. According to the result, it can be understood that the welding using the horseshoe-shaped waveform provides more excellent welding properties than the welding using the rectangular waveform.

Figure 6:
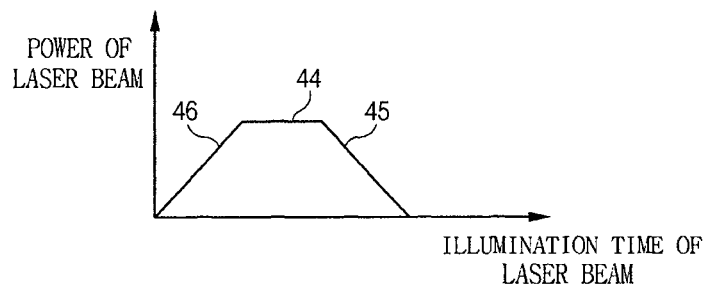

Table 3 lists welding depths, average sizes of the humping, and frequencies of occurrence of the humping according to different input heat amounts of the laser beam having the waveform shown in FIG. 6. The waveform of the power of the laser beam according to the time of laser welding shown in FIG. 6 is a trapezoidal waveform. Namely, the waveform includes a rising portion 43 in which the power of the laser beam is gradually increased, a power maintaining portion 44 in which the power of the laser beam after the rising portion 43 is maintained uniform, and a falling portion 45 in which the power of the laser beam after the power maintaining portion 44 is gradually decreased. Here, the illumination times of the laser beam in the rising portion 43, the power maintaining portion 44, and the falling portion 45 are set to be substantially equal to each other, but the present invention is not limited thereto. The input heat amount and other welding conditions are set similarly to the case of rectangular waveform.

TABLE 3

| Input Heat Amount (J/cm²) | Illumination Time of Laser Beam (ms) | Welding Depth (μm) | Size of Humping (μm) | Frequency of Occurrence of Humping |
| --- | --- | --- | --- | --- |
| 15 | 150 | 165 | — | — |
| 30 | 150 | 450 | — | — |
| 45 | 150 | 580 | — | — |
| 60 | 150 | 701 | — | — |
| 75 | 150 | 788 | 66 | 1 |

As seen from Table 3, the welding depth in the case of trapezoidal waveform is also slightly increased in comparison to the caser of rectangular waveform. Particularly, the humping occurs once, and the size of humping is smaller than that of the case of rectangular waveform with respect to the same input heat amount. According to the result, it can be understood that the welding using the trapezoidal waveform provides more excellent welding properties than the welding using the rectangular waveform.

Figure 7:
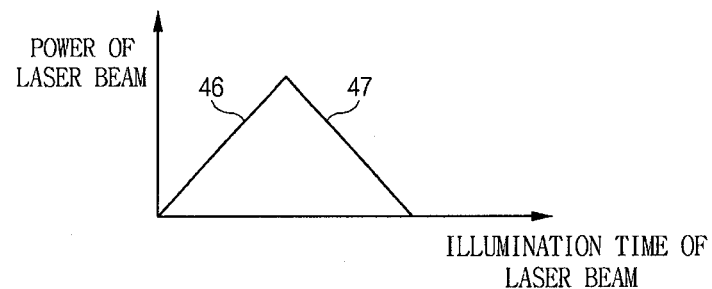

Table 4 lists welding depths, average sizes of the humping, and frequencies of occurrence of the humping according to different input heat amounts of the laser beam having the waveform shown in FIG. 7. The waveform of the power of the laser beam according to the time of laser welding shown in FIG. 7 is a triangular waveform. Namely, the waveform includes a rising portion 46 in which the power of the laser beam is gradually increased and a falling portion 47 in which the power of the laser beam after the rising portion 46 is gradually decreased. Here, the illumination times of the laser beam in the rising portion 46 and the falling portion 47 are set to be substantially equal to each other, but the present invention is not limited thereto. The input heat amount and other welding conditions are set similarly to the case of rectangular waveform.

TABLE 4

| Input Heat Amount (J/cm²) | Illumination Time of Laser Beam (ms) | Welding Depth (μm) | Size of Humping (μm) | Frequency of Occurrence of Humping |
| --- | --- | --- | --- | --- |
| 15 | 150 | 141 | — | — |
| 30 | 150 | 388 | — | — |
| 45 | 150 | 580 | — | — |
| 60 | 150 | 694 | — | — |
| 75 | 150 | 729 | 74 | 1 |

As seen from Table 4, the welding depth in the case of triangular waveform is also slightly increased in comparison to the caser of rectangular waveform. However, the humping occurs once, and the size of humping is smaller than that of the case of rectangular waveform with respect to the same input heat amount. According to the result, it can be understood that the welding using the triangular waveform provides more excellent welding properties than the welding using the rectangular waveform.

Hereinafter, states of welding of the noble metal tips on the ground electrode or the central electrode according to the different input heat amounts of the laser beams having the waveforms shown in FIGS. 5 to 7 which provides more excellent effects than the laser beam of rectangular waveform will be described.

Figure 8:
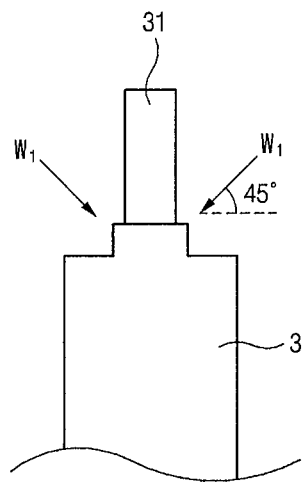
FIG. 8 is a side view illustrating an electrode tip to which welding according to an embodiment of the present invention is applied.
Figure 9:
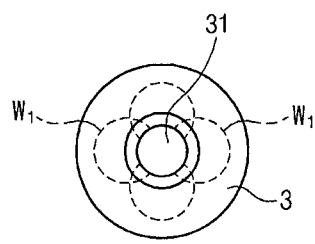
FIG. 9 is a plan view as seen from arrow VI of FIG. 8.

As shown in FIGS. 8 and 9, the welding is performed by illuminating the laser beam to four sites W1 with an angle of 45° between the central electrode 3 and the electrode tip 31. The electrode tip 31 is an iridium tip having a diameter of 0.6 mm. The laser beam has a beam diameter of 600 μm. The illumination time of the laser beam is set to 150 ms.

FIGS. 10 to 15 are photographs of cross sections after a horseshoe-shaped waveform beam with different input heat amounts is applied to the central electrode and the noble metal tip. The welding conditions are listed in the following Table 5.

TABLE 5

Figure 10:
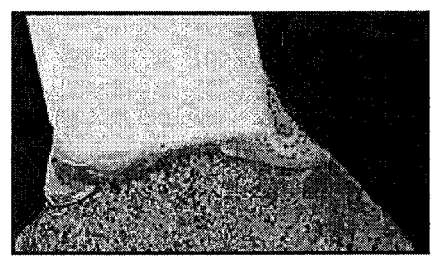

| Figure of Embodiment | Total Input Heat Amount of Laser Beam (J/cm²) |
| --- | --- |
| FIG. 10 | 60 |
| FIG. 11 | 70 |
| FIG. 12 | 100 |
| FIG. 13 | 130 |
| FIG. 14 | 150 |
| FIG. 15 | 195 |

According to the result, it can be understood that, in FIG. 16, the only the contact surface of each alloy is slightly melted due to insufficient input heat amount of the laser beam.

It can be understood that, in FIGS. 11 to 14, a boundary surface between the electrode tip and the central electrode is completely melted so as to form a welded portion. It can be understood that, in FIG. 15, large pores are generated on the melted surface due to excessive input heat of the laser beam and the melted state is not suitable. Therefore, most preferably, the total input heat amount of the laser beam having the horseshoe-shaped waveform is in a range of 70 J/cm² to 150 J/cm².

FIGS. 16 to 20 are photographs of cross sections after a trapezoidal waveform beam with different input heat amounts is applied to the central electrode and the noble metal tip. The welding conditions are listed in the following Table 6.

TABLE 6

Figure 17:
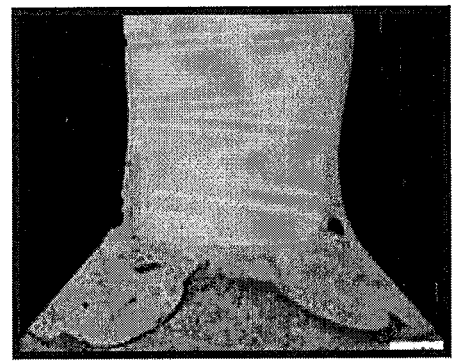
Figure 18:
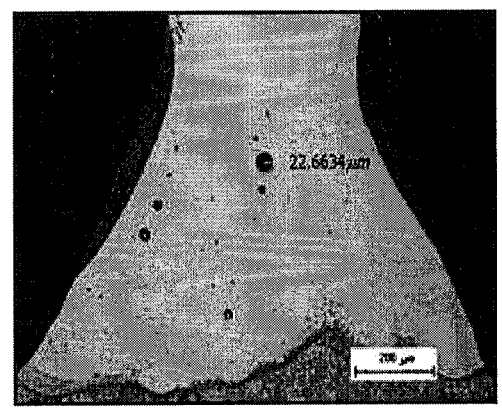
Figure 19:
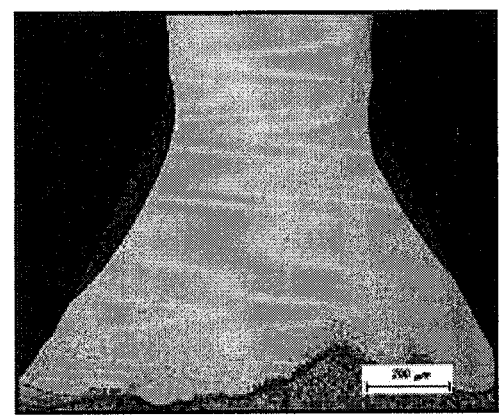
Figure 20:
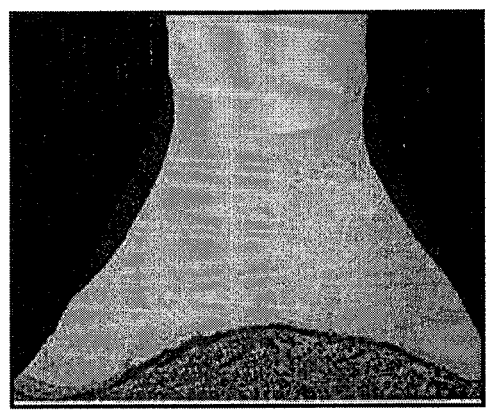

| Figure of Embodiment | Total Input Heat Amount of Laser Beam (J/cm$^2$) |
|---|---|
| FIG. 16 | 50 |
| FIG. 17 | 60 |
| FIG. 18 | 105 |
| FIG. 19 | 150 |
| FIG. 20 | 180 |

According to the result, it can be understood that, in FIG. 16, the electrode tip is not melted due to insufficient input heat amount of the laser beam.

It can be understood that, in FIGS. 17 to 19, a boundary surface between the electrode tip and the central electrode is completely melted so as to form a welded portion. It can be understood that, in FIG. 20, relatively large pores are generated on the melted surface due to excessive input heat of the laser beam and the melted state is not suitable. Therefore, most preferably, the total input heat amount of the laser beam having the trapezoidal waveform is in a range of 60 J/cm$^2$ to 150 J/cm$^2$.

FIGS. 21 to 24 are photographs of cross sections after a triangular waveform beam with different input heat amounts is applied to the central electrode and the noble metal tip. The welding conditions are listed in the following Table 7.

TABLE 7

Figure 21:
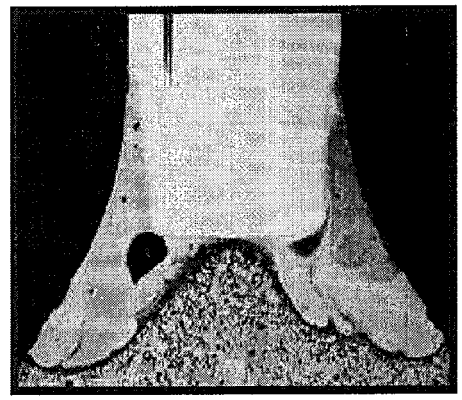
Figure 22:
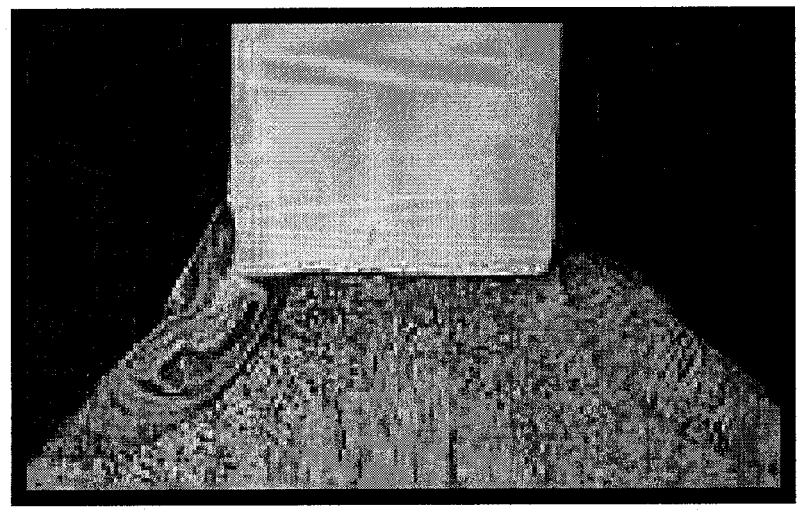

| Figure of Embodiment | Total Input Heat Amount of Laser Beam (J/cm$^2$) |
|---|---|
| FIG. 21 | 50 |
| FIG. 22 | 60 |
| FIG. 23 | 105 |

TABLE 7-continued

| Figure of Embodiment | Total Input Heat Amount of Laser Beam (J/cm$^2$) |
|---|---|
| FIG. 24 | 150 |
| No Figure | 180 |

According to the result, it can be understood that, in FIG. 21, the electrode tip is not melted due to insufficient input heat amount of the laser beam.

It can be understood that, in FIGS. 22 to 24, a boundary surface between the electrode tip and the central electrode is completely melted so as to form a welded portion. In a case where the total input heat amount of the laser beam is 180 J/cm$^2$, the peak power of the laser beam is so high that the electrode tip is separated. Therefore, it is considered that the case can not be adapted to mass production.

Therefore, most preferably, the total input heat amount of the laser beam having the triangular waveform is in a range of 60 J/cm$^2$ to 150 J/cm$^2$.

While the present invention has been particularly shown and described with reference to exemplary embodiments thereof, it will be understood by those skilled in the art that various changes in form and details may be made therein without departing from the spirit and scope of the invention.

The invention claimed is:

1. A method of welding a spark plug electrode tip to attach a noble metal tip of a spark plug to an electrode by using laser welding, wherein a waveform of a power of a laser beam according to a time of the laser welding is a horseshoe-waveform where a power of a central portion thereof is smaller than those of both end portions thereof; and wherein a total input heat amount of the laser beam is in a range of 70 J/cm$^2$ to 150 J/cm$^2$.

* * * * *